Nov. 10, 1959  R. PARRY  2,911,739
SLIDE DRIVE ASSEMBLY FOR BOMBING TRAINING DEVICE
Filed July 30, 1956  2 Sheets-Sheet 1
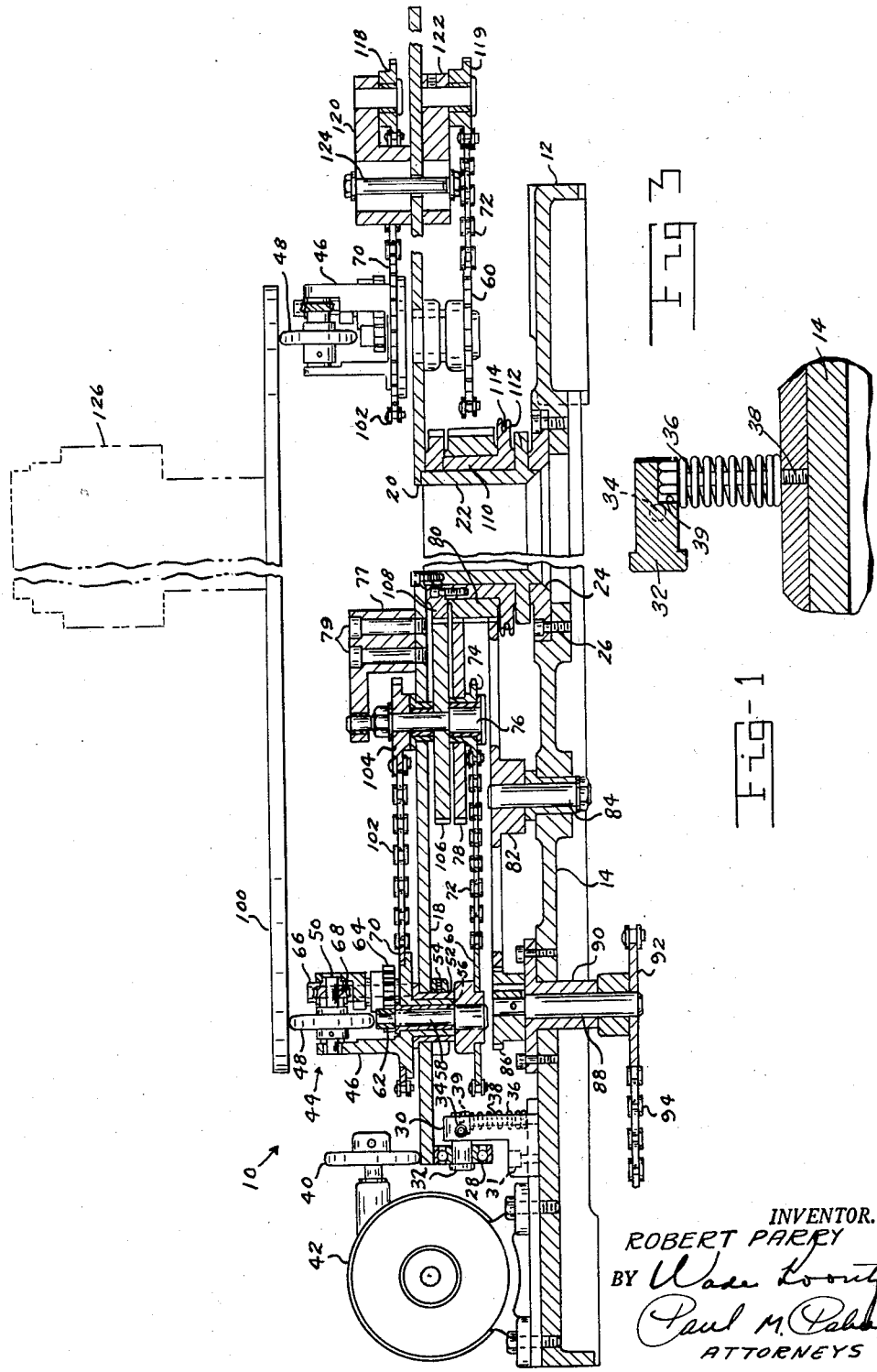
INVENTOR.
ROBERT PARRY
BY
ATTORNEYS

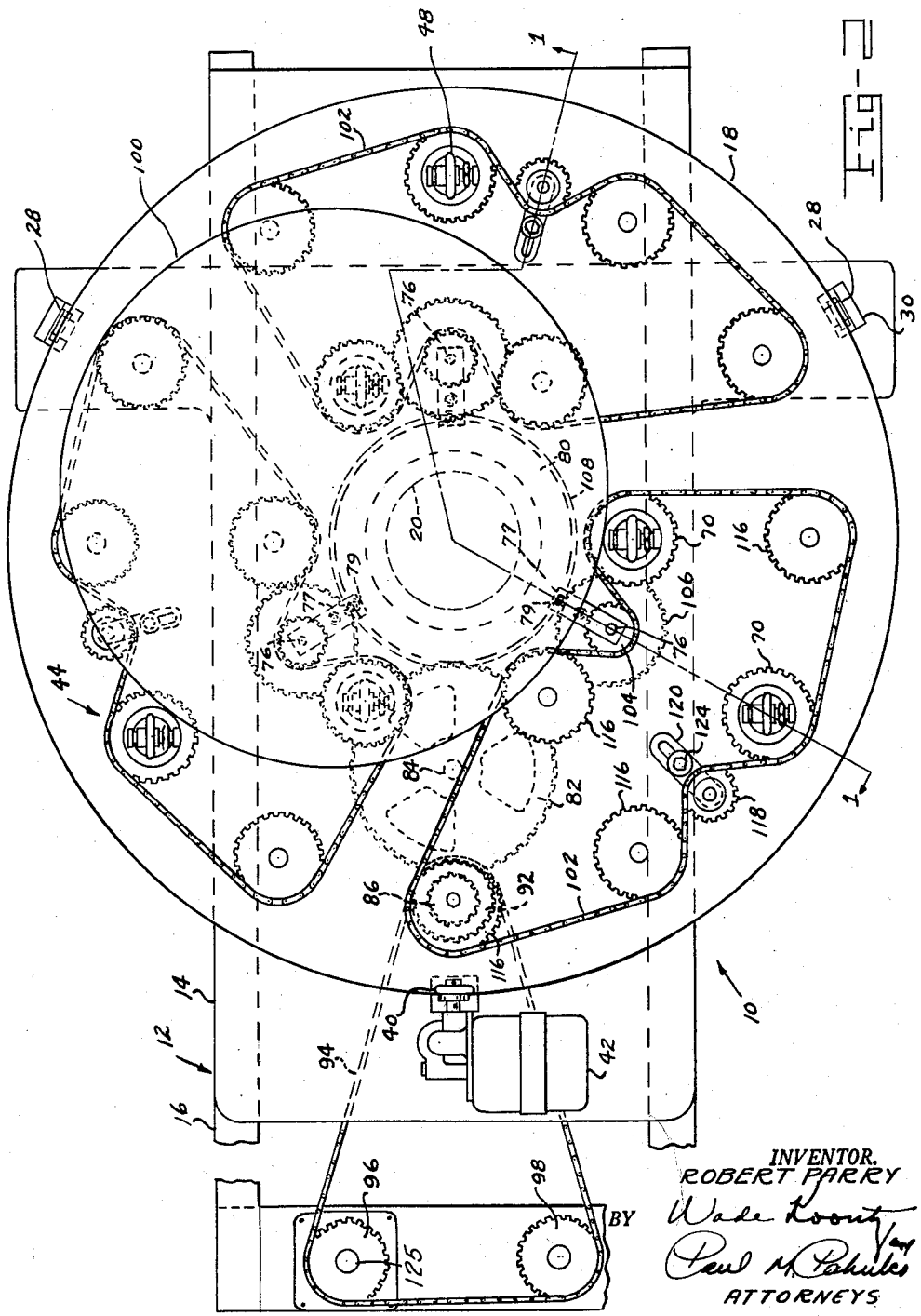

2,911,739

SLIDE DRIVE ASSEMBLY FOR BOMBING TRAINING DEVICE

Robert Parry, Cincinnati, Ohio, assignor to the United States of America as represented by the Secretary of the Air Force Application July 30, 1956, Serial No. 601,098

3 Claims. (Cl. 35—25)

This invention relates to a drive mechanism, and more particularly, to a drive mechanism assembly of the type employed in a visual bombing ground training device for moving a mosaic emulsion photographic plate containing a picture of a terrain for instructing bombardiers, navigators, and the like personnel in sighting targets under simulated flight conditions.

The main purpose of the present invention is to provide a novel drive mechanism for use in visual bombing ground training devices, which drive mechanism is of simple construction, very reliable in operation, and which very effectively simulates all the necessary flight conditions for instructing bombardiers in sighting the target.

It is further the purpose of the present invention to provide a drive mechanism whereby a terrain plate may be driven at any desired speed for simulating the aircraft ground speed and which may be rotated about a center through 180° clockwise or counterclockwise for drift settings. Also, the terrain plate may, further, in conjunction with plate means rotatable 360° be operated for setting various aircraft headings thereby simulating aircraft turning at any direction for target finding during bombing practices.

In training devices of this sort up to the present, there has been no provision for simulating turning of an aircraft 360° to find the target since the terrain plate can only be moved in a backward and forward direction. However, with the drive mechanism of the present invention, the terrain plate can be rotated 180° clockwise or counterclockwise and also be moved in the opposite direction. This saves a tremendous amount of time in training personnel since flight conditions are simulated in this return position of the terrain plate which is not the case in the presently existing training devices.

The drive mechanism of the present invention may also be used in ground training devices of the type used for instructing students in various navigational problems.

Generally, the terrain plate drive mechanism constructed in accordance with the present invention consists of a mosaic emulsion photoplate containing a picture of a terrain. The plate is floatably mounted on a roller assembly which drives the plate at any velocity and at any heading for drift compensation. The roller assembly is rotatably mounted on a rotating main plate, which plate may be rotated 360° for aircraft heading settings.

The drive mechanism further comprises a novel drive for the roller assembly for driving the terrain plate at the desired amount of drift on the terrain plate. The roller assembly is further operatively connected to the main plate in such a manner so that the main plate may be rotated through 360° and the terrain plate be still moved in the same direction by being rotated in the opposite direction the same degree of angular movement as the degree of angular movement of the main plate thereby simulating aircraft heading change at any direction through 360° for finding the target during bombing practices. The ground velocity and the drift setting may be electrically controlled by the instructor so as to simulate flight conditions.

These and other features of the present invention are described in detail below in connection with the accompanying drawings wherein like numerals designate like parts, and in which:

Figure 1 is a side elevation partly in section taken substantially along the line 1—1 in Figure 2, of a drive assembly for a terrain slide embodying the present invention;

Figure 2 is a top plan view of the device of Figure 1; and

Fig. 3 is an enlarged, longitudinal sectional view, partly broken away, illustrating details of the main plate roller support assembly of the invention with the bolt and spring thereof shown in full.

The slide drive assembly illustrated in the drawings as an embodiment of the present invention is indicated generally by the reference numeral 10 and, as shown, comprises a stationary housing 12 consisting of a base plate 14 which may be mounted on channels 16 as shown in Figure 2. Rotatably mounted on the base plate 14 is a main plate 18 formed with an opening 20 at the center thereof which opening 20 is fixed to a hollow sleeve or trunnion member 22 for rotation in a horizontal plane, which member 22 is rotatably mounted on a thrust bearing 24 attached to the base plate 14 by cap screws 26 as shown in Figure 1. The main rotatable plate 18 is further supported adjacent its circumferential edge on support rollers 28 (see Fig. 2) mounted on brackets 30 attached to the base plate 14 by cap screws 31. The support rollers 28 are mounted on the brackets 30 by bearing shafts 32 pivotally supported on the brackets 30 by set screws 34 (see Fig. 1). Each of said bearing shafts 32 is further provided with a spring 36 supported on a bolt 38 mounted in an upright position on base plate 14 as generally shown in Fig. 1 and more particularly shown in Fig. 3 of the drawings to limit downward pivoting or counterclockwise movement of each bearing shaft 32 and support roller 28. Each of the bearing shafts 32 is also formed with a cut-out portion 39 at its free end in which cut-out portion 39 is positioned in abutting relation the upper end or head portion of the bolt 38 to thereby limit upward pivoting movement of each bearing shaft 32 and support roller 28. In this manner, roller 28 is balanced on its pivot in a substantially horizontal position.

Rotation of the main plate 18 is effected by a friction roller 40 engaging the upper surface of the plate 18 and driven by a motor 42 mounted on the base plate 14. By this arrangement, the main plate 18 may be rotated through 360° for setting the aircraft heading at any direction. The main plate 18 is further arranged to support for rotation therewith a roller assembly 44. As shown in Figure 1, the roller assembly 44 comprises a plurality of brackets 46 each of which supports a roller 48 mounted on a horizontally extending shaft 50 for rotation in a vertical plane. Each bracket 46 is rotatably mounted on the main plate 18 by a bearing 52 held on the main plate 18 by a nut 54. Each bracket 46 of the roller assembly 44 is further provided with a bearing 56 through which extends a shaft 58. The shaft 58 is arranged to carry fixed thereto at its lower end a sprocket gear 60 and at its upper end a gear 62 fixed thereto meshing with a gear 64, which gear 64 drives a worm gear 66 which meshes with a gear 68 fixed on the shaft 50 for driving the roller 48. Also fixed on each bracket 46 above the main plate 18 is a sprocket gear 70 for rotating each bracket 46 about its vertical axis about the shaft 58 for a purpose as hereinafter described.

The sprocket gear 60 on each bracket 46 and fixed to the shaft 58 is arranged for driving the roller 48 and is further connected by a sprocket chain 72 to a sprocket 74 fixed to the lower end of a shaft 76 extending vertically through the main plate 18 and journalled at its upper end in bracket 77 mounted on the main plate 18 by cap screws 79, as shown in Figure 1. The sprocket 74 is fixed to and driven by a gear 78 rotatably positioned on the shaft 76 and meshing with a wide ring gear 80. The wide ring gear 80 meshes with an idler gear 82 on a shaft 84 mounted for rotation on the base plate 14. The idler gear 82 meshes with a smaller gear 86 on shaft 88 journalled on the base plate 14 in a bushing 90. The shaft 88 has fixed thereto at its lower end a sprocket 92 driven by a velocity determining chain 94, which chain 94 engages a main driving sprocket 96 driven by a motor (not shown but connected to shaft 125) and a chain idler sprocket 98, as shown in Figure 2. By this chain and gear arrangement the rollers 48 of the roller assembly 44 are driven at any desired speed for moving a mosaic emulsion photographic or slide plate 100 containing a picture of a terrain which plate or slide is floatably supported on the rollers 48 as shown in Figures 1 and 2.

Rotation of the brackets 46 of the roller assembly 44 about their vertical axes for changing angularly the bearing direction or plane of rotation of the rollers 48 for drift setting is obtained by the sprocket gear 70 which is driven by a sprocket chain 102 engaged by a sprocket 104 fixedly mounted on that portion of the shaft 76 extending above the main plate 18. The sprocket 104 is driven by gear 106 fixed on the shaft 76 and which gear 106 meshes with a ring gear 108 fixed to a sleeve bearing 110 adapted for rotation on the previously mentioned hollow sleeve or trunnion member 22. The sleeve bearing 110 is further provided at its lower end with a pulley 112 fixed thereto adapted to receive and be operated by a cable 114. Operation of the cable 114 will cause the roller assembly 44 to be rotated on the vertical axis of each bracket 46 thereby changing the bearing direction or plane of rotation of the rollers 48 for setting the drift heading.

From the above description it will be apparent that rotation of the main plate 18, about its center by the friction rollers 40, for example, counterclockwise from the position shown in Figure 2 will cause reverse rotation of the rollers 48 and cause their brackets 46 to rotate about their vertical axes in the opposite direction, or clockwise, the same degree of angular movement as the degree of angular movement of the plate 18 by actuation of the sprocket gear 70, chain 102, sprocket 104 and gear 106 which is walked around the ring gear 108. By this arrangement, while the heading of the airplane has been changed by rotation of the main plate or slide 18, the terrain plate 100 will still be frictionally driven in the same direction by the rollers 48 which remain in the same direction since they were rotated in the opposite direction to the rotary adjustment of the rollers 40 the same amount that the plate 18 was adjusted thereby simulating aircraft turning to a new heading. However, if it is desired to introduce drift, it may be done so by changing the bearing direction of the rollers 48 by actuation of the cable 114 by any suitable adjustment means.

Also, each of the chain drives 72 and 102 is also provided with idler gears 116 mounted above and below the main plate 18, respectively, as shown in Figure 2. Furthermore, idler sprockets 118, 119 as seen in Fig. 1 are provided, which sprockets 118, 119 are adjustably mounted above and below the main plate 18 by brackets 120 and 122, respectively, which brackets 120 and 122 are adjustably attached to the main plate 18 by a bolt 124. The upper idler sprocket 118 is employed for the chain drive 102, while the lower idler sprocket 119 is employed for the chain drive 72 as shown in Figure 1.

Furthermore, the terrain sighted on the photographic or slide plate 100 may be transmitted to a bombsight (not shown) by magnifying lenses located above the photographic or slide plate 100, as schematically shown by a phantom line 126, so as to simulate flight conditions for the student bombardier and instructor. The instructor can vary the speed and drift of the emulsion photographic or slide plate 100 to determine the ability of the student to find his target.

The present invention has been described in detail above for purposes of illustration only and is not intended to be limited by this description or otherwise except as defined in the appended claims.

I claim:

1. A drive assembly for a slide plate of a visual bombing training device, comprising a main plate rotatably mounted on a housing for rotation in a horizontal plane, slide plate driving means mounted for rotation about a vertical axis with said main plate comprising a plurality of brackets rotatably mounted on said main plate, roller means supported by said plurality of brackets for rotation about a horizontal axis, said slide plate supported on said roller means to be driven thereby, power means for effecting rotary movement of said roller means at a controlled speed comprising a sprocket gear mounted on each of said rotatably mounted brackets, a sprocket chain attached at one end thereof to said sprocket gear, a sprocket at the other end of said sprocket chain, and variable speed sprocket driven gear means for driving said sprocket and said roller means at varying speeds, and drift control means for effecting rotation of said slide plate driving means, whereby said slide plate may be driven at various speeds and be moved at any direction for simulating flight conditions.

2. A drive assembly for a mosaic emulsion slide plate of a visual bombing training device, comprising a stationary base, a main plate, means rotatably mounting said main plate on said base for heading setting through 360° comprising a trunnion engaged in a central opening incorporated in said main plate in fixed relation thereto and rotatably mounted on thrust bearing means affixed to said base, circumferentially disposed support means including a plurality of support rollers journalled on said base to provide additional support to said plate and pivotally supported bearing shaft means mounting each of said additional support rollers in supporting relation relative to said main plate, and means limiting pivotal movement of said bearing shaft means in either up or down direction comprising bracket mounted bolt means in engagement at one end thereof in a cut-out portion in said bearing shaft means for limiting upward pivoting movement thereof and spring means supported on said bolt means between said shaft means and said bracket limiting downward pivoting movement of said bearing shaft means, power means for effecting rotary movement of said main plate in a horizontal plane, slide plate mounting means mounted on said main plate for rotation therewith including a rotatably mounted roller support means between said main plate and said emulsion slide plate comprising rotatably mounted bracket means positioned on said main plate, rotatably mounted bearing shaft means incorporated in said rotatably mounted bracket means, and a plurality of rollers supported in horizontal relation on said rotatably mounted bearing shaft means, said slide plate mounting means being rotatable about a vertical axis for drift setting at any angular direction, slide plate driving means on said rotatably mounted bearing shaft means rotatable in a vertical plane, said mosaic emulsion slide plate floatably supported on said plurality of rollers of said rotatably mounted bearing shaft means, a chain drive for effecting rotation of said slide plate driving means at a controlled speed, and a separate chain drive for setting said slide plate mounting means at any angular direction thereby simulating flight conditions.

3. A drive mechanism for a terrain plate of a visual bombing training device, comprising a stationary base, a main plate rotatably mounted on said base for setting various headings through 360°, means for effecting rotary movement of said main plate in a horizontal plane, a roller assembly on said main plate for rotation therewith, said roller assembly being rotatable about a vertical axis for drift settings at any angular direction, means for rotating said roller assembly about the vertical axis, roller means on said roller assembly supporting said terrain plate thereon, means for effecting rotation of said roller means for driving said terrain plate at a controlled speed thereby simulating ground speed comprising a main driving sprocket adapted for mounting adjacent said stationary base and adapted to be driven by a motor, a chain idler sprocket mounted in spaced relation to said driving sprocket, a sprocket gear on each of a plurality of rotatably mounted support brackets rotatably positioned on said main plate in circumferential relation thereto, a support shaft supporting each of said sprocket gears extending upwardly through said main plate, a first sprocket chain attached to and driving said support shaft and said sprocket gear, a velocity determining chain engaging said main driving sprocket and said chain idler sprocket and driving said first sprocket chain to drive said roller means and said terrain plate at selected speeds, and means operatively interconnecting said main plate and said roller assembly, whereby said roller assembly is automatically rotated in the opposite direction to the direction of rotation of said main plate and at the same amount so that the terrain plate may continue moving in the same direction while said main plate is rotated thereby simulating aircraft turning at any direction for finding the target.

References Cited in the file of this patent

UNITED STATES PATENTS

| | | | |
|---|---|---|---|
| 546,912 | Boettcher | Sept. 24, | 1895 |
| 631,306 | Hollingsworth | Aug. 22, | 1899 |
| 1,313,685 | Gilbert | Aug. 19, | 1919 |
| 2,046,202 | Miles | June 30, | 1936 |
| 2,491,308 | Gorton et al. | Dec. 13, | 1949 |
| 2,671,970 | Schmitt | Mar. 16, | 1954 |
| 2,697,883 | Pellaton | Dec. 28, | 1954 |